United States Patent [19]
Alber et al.

[11] 3,816,812
[45] June 11, 1974

[54] PORTABLE APPARATUS FOR MEASURING LOAD RESISTANCE

[76] Inventors: Glenn Alber, 905 N.W. 6th St., Boca Raton, Fla. 33432; Carl H. Alber, 105 S. Boulevard, Boynton Beach, Fla. 33435

[22] Filed: Apr. 19, 1973

[21] Appl. No.: 352,611

[52] U.S. Cl. ............................................. 324/62
[51] Int. Cl. ........................................... G01r 27/02
[58] Field of Search ................... 324/62, 64, 30 R

[56] References Cited
UNITED STATES PATENTS
| | | | |
|---|---|---|---|
| 3,296,523 | 1/1967 | Haas | 324/64 X |
| 3,676,770 | 7/1972 | Sharaf et al. | 324/62 X |
| 3,731,189 | 5/1973 | Sharaf et al. | 324/62 |

FOREIGN PATENTS OR APPLICATIONS
| | | | |
|---|---|---|---|
| 1,169,711 | 11/1969 | Great Britain | 324/64 |
| 1,221,703 | 2/1971 | Great Britain | 324/62 |

Primary Examiner—Stanley T. Krawczewicz
Attorney, Agent, or Firm—Sherman & Shalloway

[57] ABSTRACT

Portable apparatus for measuring the resistance of a load including a current pulse power supply generating a current pulse to be supplied to the load, a digital voltmeter for detecting the voltage across the load and displaying a digital signal representative of the resistance of the load and a control circuit operating the digital voltmeter only when the current pulse has a predetermined amplitude. The portable apparatus is particularly advantageous for measuring the resistance of circuit breaker contacts with current pulses having an amplitude of 100 amps.

15 Claims, 6 Drawing Figures

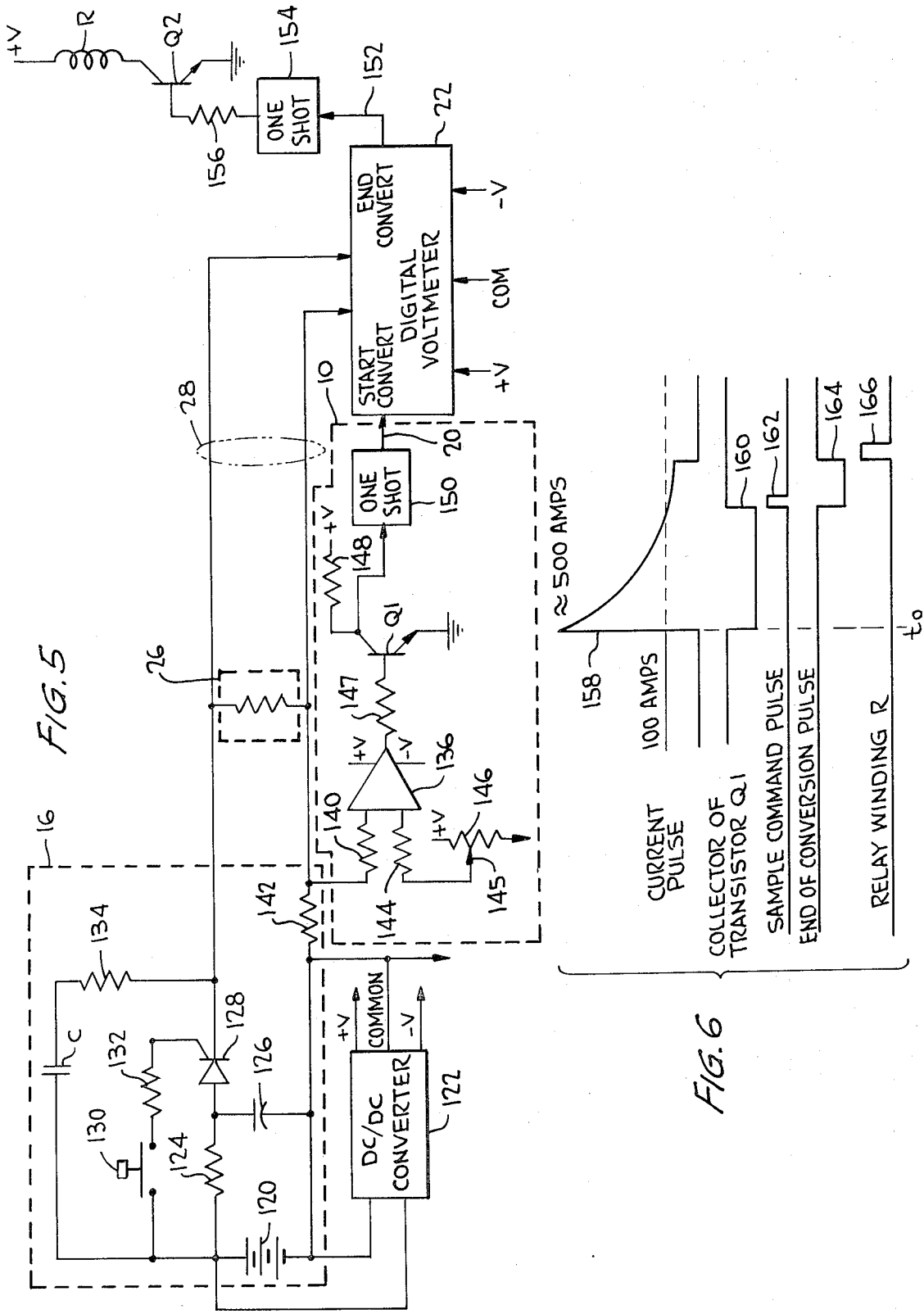

PORTABLE APPARATUS FOR MEASURING LOAD RESISTANCE

BACKGROUND OF THE INVENTION

1. Field of the Invention

The present invention pertains to apparatus for measuring the resistance of a load and, more particularly, to apparatus for measuring the resistance of breaker contacts utilized for switching electrical power.

2. Discussion of the Prior Art

The breaker resistance of contacts for use in switching and distributing electrical power is required to be determined during production of such breaker contacts as well as in the field for preventive maintenance. The measurement of breaker contact resistance must be extremely accurate in order to provide ratings in accordance with ASA standards, the measuring of such breaker resistance being commonly referred to as millivolt drop testing.

ASA standards require that high voltage power circuit breaker contact resistance be measured by applying 100 amps across the circuit breaker terminals. This is because contacts on oil breakers have an oil film which, in essence, functions as an adddditional resistance in series with the contact resistance of the breakers. It has been found the resistance of the oil film breaks down upon application of a current of 50 – 60 amps through the film. After this amperage is passed through the film, the film breaks down and no longer acts as a series resistance. In order words, this is an irreversible phenomenon. Consequently, in order to avoid measurement errors in breaker contact resistance, the ANSI standard specifies that 100 amps must be applied through the circuit breaker to break down the resistance of the oil film.

This oil film resistance, of course, is dissipated or, rather, destroyed as soon as the circuit breakers are placed on line and receive heavy current, so that it is not a problem with circuit breakers operating in the field. However, as just explained, the oil film resistance must be taken into account when testing circuit breakers. It is because of this ANSI standard that the test sets of the prior art, which supply only low amperage test signals, cannot be utilized.

In order to supply enough current, motor generator units have, in the past, been utilized for production testing of circuit breakers of various ratings; however, such motor-generator units are extremely heavy, stationary in nature and, accordingly, are limited to production testing and not useful in the field. In motor-generator type testing apparatus, the generator provides a continuous current to the circuit breaker contacts, which current must be measured at the output of the generator while a voltmeter is connected across the circuit breaker contacts to determine the voltage, the combination of current and voltage thus being utilized to calculate the resistance of the circuit breaker contacts in accordance with Ohm's law. In practice, at least two operators are required to test circuit breakers with a motor-generator unit, and the average testing time for millivolt drop testing with a motor-generator unit is several hours due to the manpower requirement, the amount of power required, and the fact that overhead cranes are required to move the breaker contacts to be tested to the motor-generator unit since the motor-generator unit itself cannot be moved.

In order to overcome the obvious disadvantages of millivolt drop testing with a motor-generator unit, it has been suggested to utilize a battery-powered solid-state power supply along with a digital voltmeter providing a continuous current for testing circuit breakers. Since, in accordance with ASA standards, power circuit breakers must be tested at 100 amps, the weight of such solid-state power supplies is normally at least 100 pounds; and, thus, such battery-powered units are not portable from a practical standpoint and cannot be easily utilized for field testing of circuit breakers. Furthermore, such battery-powered units can be used from a practical standpoint only to test loads having a resistance less than 0.01 ohms; and, thus, such units suffer the disadvantage of not being useful for measuring loads other than low resistance circuit breakers.

In general, the test sets of the prior art are not suitable for measuring circuit breaker contact resistance because these test sets are used to measure purely resistive loads. Circuit breakers, however, have inductive loads associated therewith which tend to cause these prior art resistance test sets to give erroneous readings. This is another reason over and above the requirement for application of a 100-amp test current that the aforementioned motor generator sets are utilized.

SUMMARY OF THE INVENTION

Accordingly, it is a basic object of the present invention to overcome the above disadvantages of the prior art by providing apparatus for measuring the resistance of a load, particularly for providing millivolt drop testing for circuit breaker contacts.

It is another object of the present invention to provide a new and improved testing apparatus, wherein the testing apparatus measures resistance of a load while compensating for inductance associated with the load.

A further object of the present invention is to construct a millivolt drop tester for testing circuit breakers with 100 amp current while having a weight so as to render the unit portable, such weight being approximately 25 pounds.

Another basic object of the present invention is to measure the resistance of a load by supplying a current pulse to the load and detecting the voltage across the load when the current pulse is supplied thereto such that the weight and bulkiness of the apparatus is greatly reduced.

The present invention has an additional object in that apparatus for measuring the resistance of a load is rendered completely portable by utilizing a battery in a current pulse power supply to permit the apparatus to be transported easily by a single operator.

Yet, a further object of the present invention is to provide millivolt drop testing apparatus that can be operated by a single person to thereby reduce testing time and facilitate preventive maintenance in the field.

Some of the advantages of the present invention over the prior art are that the apparatus is portable, accurage and easy to use, requires only a single operator, is relatively inexpensive to produce and can be assembled in a container the size of a small suitcase or briefcase so as to be easily transported for both production and field testing.

The present invention is generally characterized in apparatus for measuring the resistance of a load including a power supply for generating a current pulse to be supplied to the load, display means for detecting the voltage across the load and providing an outlet corresponding thereto, the display means translating the output and displaying a signal representative of the resistance of the load, and control means operating the display means only when the current pulse has a predetermined amplitude.

Other objects and advantages of the present invention will become apparent from the following description of the preferred embodiments taken in conjunction with the accompanying drawings.

BRIEF DESCRIPTION OF THE DRAWINGS

FIG. 5 is a schematic diagram of another embodiment of the apparatus of FIG. 1.

FIG. 6 is a timing chart for the apparatus of FIG. 5.

DESCRIPTION OF THE PREFERRED EMBODIMENTS

Figure 1:
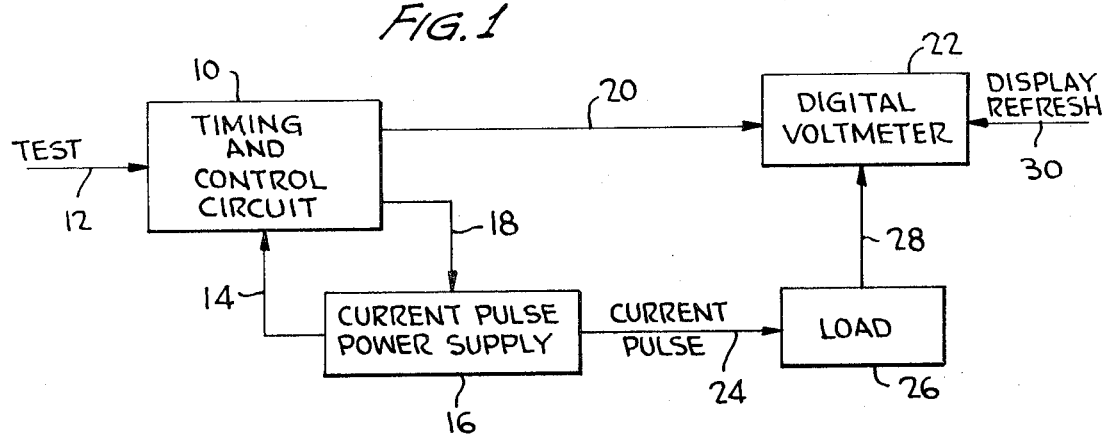
FIG. 1 is a block diagram of apparatus for measuring the resistance of a load in accordance with the present invention.

Apparatus for measuring the resistance of a load is illustrated in block diagram form in FIG. 1 and includes a timing and control circuit 10 having an input 12 providing a signal corresponding to a request for measurement and an input 14 from a current pulse power supply 16. Timing and control circuit 10 has outputs 18 and 20 supplied to the current pulse power supply 16 and a digital voltmeter 22, respectively, and the current pulse power supply 16 is responsive to a signal on output 18 of the timing and control circuit 10 to supply a current pulse on an output 24 to a load 26, the voltage across the load 26 when the current pulse is supplied thereto being supplied to an input 28 of the digital voltmeter 22 to provide a visual representation of the resistance of the load 26. Since, as mentioned in the BACKGROUND OF THE INVENTION, the load 26 may be a breaker contact resistance, the load 26 may have an inductance associated with the contact resistance. If this is the case, then the inductance will generally be in series with the contact resistance. The digital voltmeter 22 also receives a display refresh signal on an input 30 whereby the visual representation of the resistance of the load 26, which is displayed for a predetermined period of time, can again be displayed after the period of time elapses.

Briefly, in operation, when it is desired to measure the resistance of the load 26, a test signal is supplied on input 12 to the timing and control circuit 10, and the timing and control circuit is operative in response to the test signal on input 12 to supply a signal on output 18 to trigger the current pulse power supply 16. Once a current pulse of predetermined amplitude, for example 100 amps, is developed by the power supply, a signal is supplied on output 14 to the timing and control circuit which is responsive to the signal on output 14 to provide a sample command signal on output 20 to actuate the digital voltmeter 22 to read the analog voltage developed across the load in response to the current pulse on output 24 of the power supply 16, the digital voltmeter converting the analog signal to a digital signal and displaying the same for observation by an operator for a predetermined period of time. If, once the displayed signal has vanished, the operator requires the signal to be displayed again, a display refresh signal is supplied on input 30 to the digital voltmeter to again visually display the output corresponding to the resistance of the load 26. By supplying the current pulse to the load at a level of 100 amps, the voltage displayed by the digital voltmeter can be simply translated to ohms.

Figure 2:
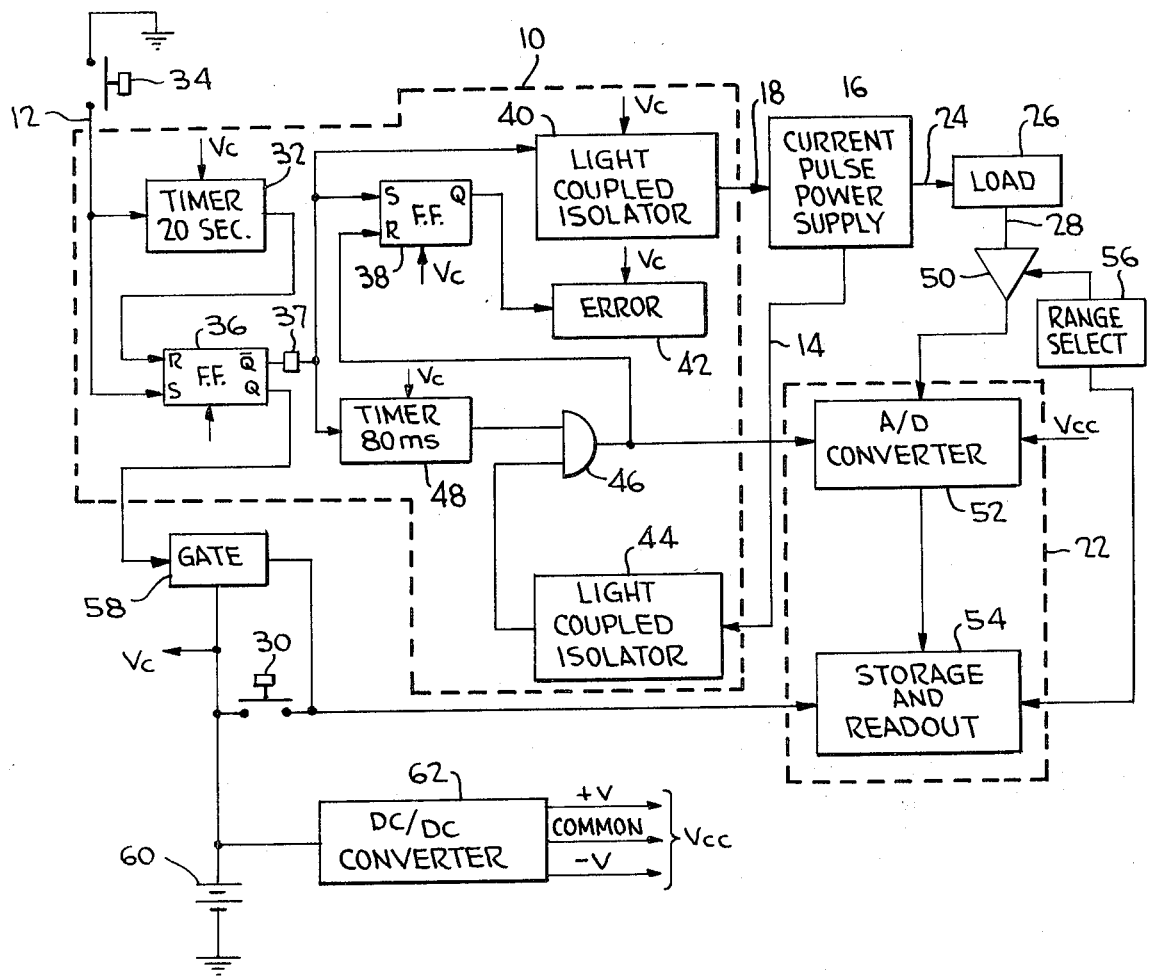
FIG. 2 is a schematic diagram of an embodiment of the apparatus of FIG. 1.

A preferred embodiment of the present invention is illustrated in FIG. 2 wherein the timing and control circuit 10 includes a 20-second timer 32 triggered by ground potential supplied at the test input 12 by means of a push button switch 34, the test signal also setting a flip-flop 36 which is reset after 20 seconds by the output from timer 32. The $\overline{Q}$ output of flip-flop 36 is differentiated at 37 and supplied to a set input of a flip-flop 38 and to a light coupled isolator 40 to trigger the current pulse power supply 16 over output 18, and the Q output of flip-flop 38 is supplied to an error indicating circuit 42, which may include a lamp or other indicator, adapted to be energized if the current pulse fails to reach a predetermined level, as will be described in detail hereinafter. The output 14 of current pulse power supply 16 is supplied through a light coupled isolator 44 to an AND gate 46 which receives a second input from a 80 millisecond timer 48 triggered by the differentiated $\overline{Q}$ output of flip-flop 36.

The current pulse generated by power supply 16 is supplied to load 26 on output 24, and the voltage across the load 26 is supplied on output 28 through an operational amplifier 50 to an analog-to-digital converter 52 in the digital voltmeter 22. The analog input signal corresponding to the voltage across load 26 is converted to a digital signal by A/D converter 52 and supplied to a storage and readout circuit 54 which provides a visual digital display representative of the resistance of the load 26. The A/D converter 52 is controlled by the output from AND gate 46 such that the A/D converter is not triggered to detect the voltage across load 26 unless the current pulse supplied to the load has reached a predetermined amplitude and the 80 millisecond time period determined by timer 48 has elapsed, the output from AND gate 46 also being supplied to the reset input of flip-flop 38. A range select circuit 56 has outputs connected with the operational amplifier 50 and the storage and readout circuit 54 in order to permit variation in the scale of the display.

The Q output from flip-flop 36 is supplied to a gate 58 in order to control the application of bias voltage Vc from a rechargeable DC battery 60 to the storage and readout circuit 54. A DC/DC converter 62 is also connected to the DC battery 60 in order to provide a bias voltage Vcc for operation of the A/D converter 52, the bias voltage Vcc including +V, −V and common potentials.

Figure 3:
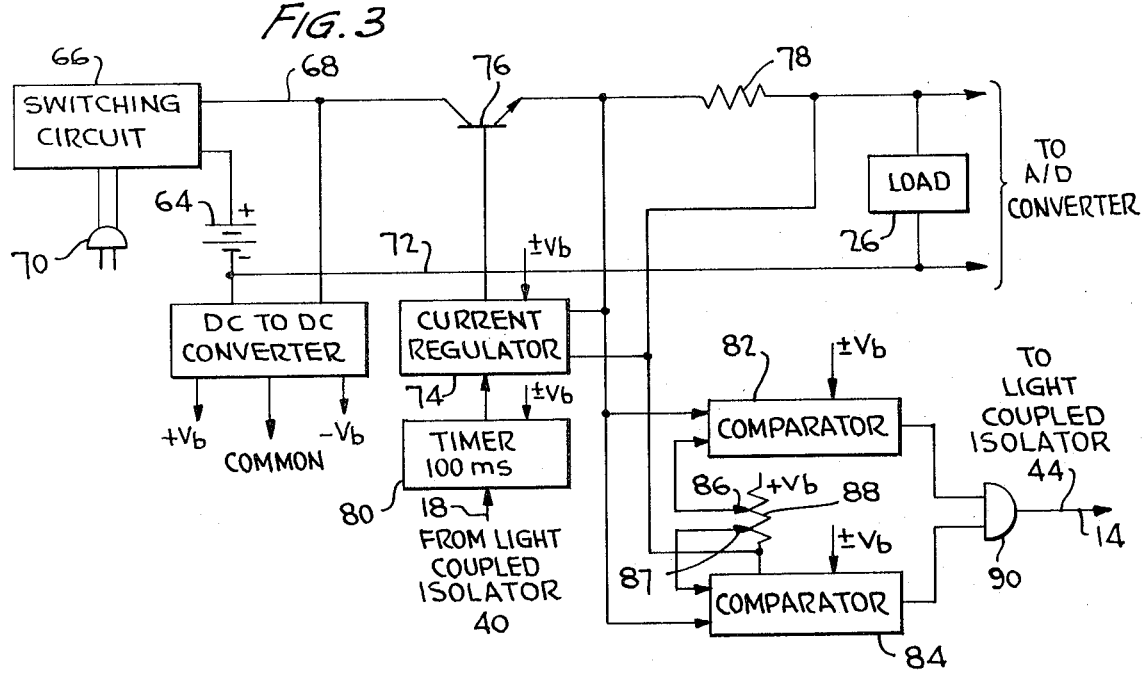
FIG. 3 is a schematic diagram of the current pulse power supply of the embodiment of FIG. 2.

The current pulse power supply 16 is illustrated in FIG. 3 and includes a rechargeable DC battery 64 connected with a switching circuit 66 such that the positive terminal of the battery 64 can be connected to a lead 68 in order to permit operation of the power supply 16 to provide a current pulse to the load 26 or through a plug 70 to an AC source for recharging the battery. If desired, a capacitor can be connected across the battery to be charged through a suitable resistance such that the capacitor can be discharged to provide the current pulse rather than directly connecting the battery 64 to provide the current pulse. The voltage from the battery 64 is applied across leads 68 and 72 to the load 26 with the current supplied to the load being regulated by a conventional current regulator 74 controlling the base of an NPN transistor 76. Of course, while a single regulating transistor 76 is illustrated in FIG. 3, a bank of transistors connected in parallel can be similarly utilized to provide current regulation, as is conventional. A sensing resistor 78 is connected in series between the emitter of transistor 76 and the load 26 with the current regulator 74 being connected across the resistor 78 to provide current regulation. The output 18 from light coupled isolator 40 of the timing and control circuit 10 is supplied to a 100 millisecond timer 80 which controls the current regulator 74 to prevent the supply of current to the load 26 until the timer is triggered and thereafter renders the regulating transistor 76 conductive for a period of 100 milliseconds.

The voltage across sensing resistor 78 is also supplied to comparators 82 and 84 which receive as second inputs reference voltages from taps 86 and 87 on a potentiometer 88, the tap 86 being set to provide a reference signal corresponding to a high level just above the predetermined amplitude of the current pulse to be supplied to the load and the tap 87 being set to provide a reference signal corresponding to a low level just below the predetermined amplitude of the current pulse such that comparators 82 and 84 provide outputs to an AND gate 90 only when the amplitude of the current pulse generated by battery 64 is between the high and low levels, preferably within ± 0.5 percent of the predetermined amplitude of the current pulse. AND gate 90 provides an output to light coupled isolator 44 such that AND gate 46 in the timing and control circuit 10 is enabled only when the current pulse generated by power supply 16 has substantially the predetermined amplitude.

Figure 4:
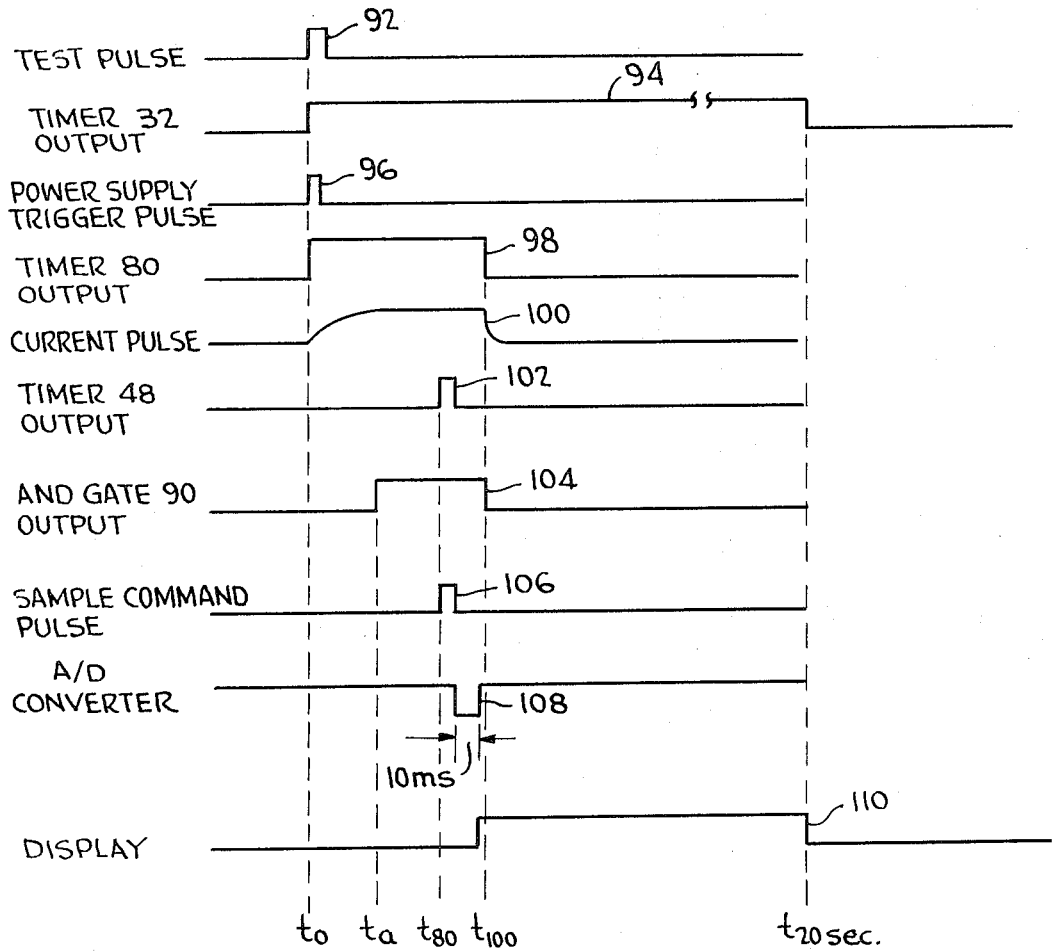
FIG. 4 is a timing chart for the apparatus of FIGS. 2 and 3.

The operation of the apparatus of FIGS. 2 and 3 will be described with reference to the timing chart of FIG. 4. In order to commence the testing operation, push button 34 is depressed to provide a test pulse 92 at time $t_o$, the pulse 92 triggering timer 32 to provide a 20-second output pulse 94 to set flip-flop 36 such that the Q output thereof enables gate 58 to provide power for the storage and readout circuit 54 for a 20-second interval. The $\overline{Q}$ output of flip-flop 36 is differentiated to supply a power supply trigger pulse 96 through the light coupled isolator 40 to trigger timer 80 in the current pulse power supply 16. Timer 80 provides a 100 ms. pulse 98 to current regulator 74 to commence generation of a current pulse 100 supplied to load 26. The current pulse 100 as read from the load 26 has a sloping configuration from time $t_o$ to $t_a$. This is because of inductance associated with the load 26. The differentiated $\overline{Q}$ output of flip-flop 36 also triggers timer 48 to supply a pulse 102 after 80 ms. to AND gate 46; and, once the current pulse reaches the predetermined amplitude, as shown at time $t_a$, the voltage sensed across resistor 78 will satisfy both comparators 82 and 84 to enable AND gate 90 to supply an output pulse 104 through light coupled isolator 44 to AND gate 46.

Thus, AND gate 46 can be enabled only after the 80 ms. time period has elapsed such that AND gate 46 supplies a sample command pulse 106 to A/D converter 52. If, after the 80 ms. time period has elapsed, the amplitude of the current pulse 100 has not reached the predetermined value, there will be no input supplied to AND gate 46 through light coupled isolator 44; and, accordingly, flip-flop 38 will remain set to energize error indicating circuit 42. During normal operation, flip-flop 38 is set by the differentiated $\overline{Q}$ output of flip-flop 36 and is reset after 80 ms. such that error indicating circuit 42 is only energized for the 80 ms. time period and is unnoticeable by an operator. However, if flip-flop 38 remains set due to AND gate 46 not being enabled, the energization of the error indicator will become noticeable.

The A/D converter 52 is responsive to the sample command pulse 106 to convert the analog voltage across the load 26 supplied to the converter 52 through operational amplifier 50 to a digital signal and supply the digital signal to storage and readout circuit 54 for display. The A/D converter 52 requires less than 10 ms., as indicated at 108 in FIG. 4, to convert the analog voltage across the load to a digital signal; and, thus, a substantially instantaneous reading is displayed by the storage and readout circuit 54 for viewing by the operator until the 20 second time period controlled by timer 32 elapses as indicated by display pulse 110. After the 20-second period set by timer 32 has elapsed, gate 58 will be inhibited to remove the display power supplied to storage and readout circuit 54; however, the circuit 54 includes a memory for storing the reading such that if the operator requires the reading to be displayed again, he need only actuate the refresh push button 30 which by-passes the gate 58 to supply display power to the storage and readout circuit 54.

By providing the current pulse 100 with an amplitude of 100 amps, the voltage sensed across the load 26 is directly translated into a measurement of resistance of the load and digitally displayed by storage and readout circuit 54. Since any inductance associated with breaker contacts to be tested causes the current to lag the voltage, the 80 ms. delay prior to enabling of AND gate 46 to supply the sample command pulse to the A/D converter 52 is provided to assure that the amplitude of the current pulse through the load at the time the resistance is measured is 100 amps. Thus, the apparatus according to the present invention utilizes a current pulse to measure resistance of a load thereby permitting the apparatus to be lightweight and compact and, therefore, easily portable while permitting the apparatus to be used to measure the resistance of inductive loads, such as breaker contacts. The apparatus of FIGS. 2 and 3 can be utilized to accurately measure resistances of from 1.0 microhm to 0.1 ohm utilizing the 100 amp pulse generated by power supply 16.

DC battery 60 and DC to DC converter 62 provide bias voltage for the digital voltmeter 22 and the component circuits of the timing and control circuit 10, and the timing and control circuit and the digital voltmeter are isolated from the DC battery in the current pulse power supply 16 in order to assure that there are no common grounds or other leads in the circuitry thereby maintaining the current pulse supplied to the load extremely precise to obtain accurate resistance measurements. The light coupled isolators 40 and 44 are thus operative to electrically isolate the input 18 and the output 14 of the current pulse power supply from the timing and control circuit 10. The switching circuit 66 includes suitable circuitry to permit charging of the rechargeable DC battery 64 from normally available alternating current and a similar switching circuit can be utilized to charge rechargeable DC battery 60. Accordingly, the apparatus of the present invention can be easily mounted in a small case the size of a briefcase with a plug extending therefrom for insertion in a wall socket to recharge the power supply battery 64 and the bias voltage battery 60.

Another embodiment of apparatus for measuring the resistance of a load according to the present invention is illustrated in FIG. 5 wherein the current pulse power supply 16 includes a DC battery 120 having low internal resistance, such as a nickel cadmium battery, the battery 120 supplying power to a DC to DC converter 122 for supplying power to digital voltmeter 22. A resistor 124 and a capacitor 126 are connected in series across the battery 120, and an SCR 128 has its anode connected to the junction between resistor 124 and capacitor 126 and its cathode connected to one terminal of the load 26, the other terminal of the load 26 being connected to the negative terminal of the battery 120 and the common terminal of the DC to DC converter 122. SCR 128 has a gate electrode connected to the positive terminal of battery 120 through a resistor 130 and a test push button switch 132, and connected across the anode and cathode of the SCR 128 is the series combination of normally open contacts C and a resistor 134.

The voltage across the load 26 is supplied over line 28 to the digital voltmeter 22, and the timing and control circuit 10 includes a comparator 136 which receives an input through a resistor 140 from a sensing resistor 142 connected in series between the negative terminal of battery 120 and the load 26 and another input through a resistor 144 from a tap 145 of a potentiometer 146. The output from the comparator 136 is connected through a resistor 147 to the base of an NPN transistor Q1 which has its collector connected to +V through a resistor 148 and connected to a one-shot monostable multivibrator 150 to provide a sample command pulse to the digital voltmeter 22 over output 20. The digital voltmeter provides an end of conversion signal on a lead 152 to a one-shot monostable multivibrator 154 which is connected through resistor 156 with the base of an NPN transistor Q2 having a relay winding R connected with the collector thereof to control the state of normally open contacts C.

The operation of the embodiment of FIG. 5 will be described with reference to the timing chart of FIG. 6. Initially, with the test push button 132 not actuated, capacitor 126 will charge through resistor 124; and, once the push button 132 is depressed at time $t_o$, SCR 128 will be triggered to discharge the capacitor 126 and supply a current pulse 158 through the load 26 and the sensing resistor 142. The initial current through the load will be approximately 500 amps; and, when the current drops to 100 amps, as shown by the dashed line, the comparator 136 will render transistor Q1 conductive, as shown at 160, to trigger the one-shot 150 and provide a sample command pulse 162 to start conversion by the digital voltmeter 22. After the analog-to-digital conversion by the digital voltmeter 22 is completed, an end of conversion pulse 164 will be supplied to one-shot 154 which will render transistor Q2 conductive to energize relay winding R, as shown at 166, and close normally open contacts C thereby rendering the SCR 128 non-conductive. After the pulse from one-shot 154 subsides, the relay winding R will be deenergized and the entire circuit will return to its quiescent state ready for the next test. Of course, digital voltmeter 22 includes readout circuitry for providing a visual display of the resistance of the load 26, and a display refresh input can be supplied to digital voltmeter 22 to display the reading again in the manner described above.

The apparatus for measuring the resistance of a load of the present invention is illustrated in FIGS. 1, 2, 3 and 5 in diagramatic form, it being appreciated that any suitable specific components could be utilized to provide the function described above. To this end, the apparatus has been shown and described from a general logical standpoint rather than over-burdening the specification with a description of a specific logic component system. Accordingly, the gating logic according to the present invention can be implemented in any suitable manner and any conventional circuits may be utilized to provide the timing, comparator, flip-flop and DC to DC converter circuitry. The light coupled isolators 40 and 44 utilize a light emissive diode providing light to a light activated, semiconductor device to render the same conductive when current flows through the light emissive diode, the light activated semiconductor device changing resistance with the reception of light to supply an input signal over output 18 from light coupled isolator 40 to current pulse power supply 16 and to supply an input pulse to AND gate 46 from light coupled isolator 44. Any standard digital voltmeter can be utilized for digital voltmeter 22, it being desirable that such digital voltmeter includes storage or memory circuitry to permit a reading to be displayed again, as is conventional. That is, the storage and readout circuit 54 will include a memory bank connected with a display device such that the memory bank will store the digital voltage from the A/D converter 52 even when the display is off.

Inasmuch as the present invention is subject to many variations, modifications and changes in detail, it is intended that all matter described above or shown in the accompanying drawings be interpreted as illustrative and not in a limiting sense.

What is claimed is:

1. Apparatus for measuring the resistance of a load, comprising:
   power supply means for generating a current pulse of a predetermined amplitude, wherein said pulse is applied to the load,
   means for detecting voltage across the load when the current pulse is applied to the load, said detecting means providing an output corresponding to the voltage, said detecting means including means for translating said output and displaying a signal representative of the resistance of the load; and
   means for controlling display of the signal, wherein said control means includes means for providing a test signal, timing means responsive to said test signal to generate a timing signal after a predetermined period of time, and error means responsive to said test signal to indicate erroneous operation if said current pulse does not reach said predetermined amplitude within said predetermined period of time as tolled by the generator of said timing signal.

2. Apparatus for measuring the resistance of a load as recited in claim 1 and further comprising bias voltage means isolated from said power supply means for supplying bias voltage to said display means and said control means.

3. Apparatus for measuring the resistance of a load as recited in claim 1 wherein said power supply means includes a rechargeable DC battery and capacitance means connected across said battery to be charged thereby and to be discharged to generate said current pulse.

4. Apparatus for measuring the resistance of a load as recited in claim 1 wherein said power supply means includes means for regulating the amplitude of said current pulse.

5. The apparatus of claim 1, wherein the load of which the resistance is being measured includes an inductance and wherein the predetermined period of time provided by said timing means is sufficient to overcome any effects on the signal representative of the resistance of the load due to the existance of said inductance.

6. Apparatus for measuring the resistance of a load as recited in claim 1, further including rechargeable battery means for generating said current pulse and for providing bias voltage for said control means and said detecting means.

7. Apparatus for measuring the resistance of a load as recited in claim 1 wherein said detecting means includes means for providing a digital visual display representative of the resistance of the load.

8. Apparatus for measuring the resistance of a load, comprising:
power supply means for generating a current pulse of a predetermined amplitude, wherein said pulse is applied to the load;
means for detecting voltage across the load when the current pulse is applied to the load, said detecting means providing an output corresponding to the voltage, said detecting means including means for translating said output and displaying a signal representative of the resistance of the load; and
control means, wherein said control means includes means for sensing the amplitude of said current pulse generated by said power supply means and providing a signal corresponding thereto, means for comparing said signal corresponding to said current pulse with a reference signal corresponding to said predetermined amplitude, and means for generating a command signal once said signal corresponding to said current pulse substantially equals said reference signal, wherein said command signal is applied to said detecting means to cause said detecting means to display the signal representative of the resistance of the load.

9. Apparatus for measuring the resistance of a load as recited in claim 1 wherein said means for generating a command signal includes timing means for delaying the generating of said command signal such that said detecting means operates after a delay to supply said output corresponding to the voltage across the load.

10. Apparatus for measuring the resistance of a load, comprising:
power supply means for generating a current pulse of a predetermined amplitude, wherein the pulse is applied to the load, said power supply means including a first timing means for controlling the generation of said current pulse for a first time period and comparator means providing an output signal when said current pulse has attained said predetermined amplitude;
means for detecting voltage across the load when the current pulse is applied to the load, wherein said detecting means provides an output corresponding to the voltage, said detecting means including means for translating said output and displaying a signal representative of the resistance of the load; and
control means for providing a test signal, wherein said control means includes second timing means responsive to said test signal to provide a timing signal for a second time period shorter than said first time period, AND gating means responsive to said timing signal and said comparator means output signal for supplying a command signal to said detecting means to cause said detecting means to display a signal representative of the resistance of the load only after said first time period elapses and prior to lapse of said second time period.

11. Apparatus for measuring the resistance of a load as recited in claim 10 wherein said detecting means includes an analog-to-digital converter responsive to said command signal for detecting the voltage across the load and a storage and readout circuit for storing and displaying a digital signal from said analog-to-digital converter representative of the resistance of the load.

12. Apparatus for measuring the resistance of a load as recited in claim 11 wherein said control means includes third timing means responsive to said test signal to provide a bias timing signal for a third time period longer than said first time period and further comprising bias voltage means for providing bias voltage for said storage and readout circuit and means responsive to said bias timing signal for supplying said bias voltage to said storage and readout circuit for said third time period.

13. Apparatus for measuring the resistance of a load as recited in claim 12 wherein said bias voltage means includes switch means manually operable to supply said bias voltage to said storage and readout circuit to refresh said displayed digital signal.

14. Apparatus for measuring the resistance of a load, comprising:
power supply means for generating a current pulse of a predetermined amplitude, wherein said pulse is applied to the load, said power supply means including a rechargeable battery having first and second terminals, a resistor and capacitor connected series between said first and second terminals, a control rectifier connected to the junction of said resistor and said capacitor, a sensing resistor connected in series with said control rectifier and battery, and means for triggering said control rectifier to discharge said capacitor through said control rectifier, the load and said sensing resistor;
means for detecting voltage across the load when the current pulse is applied to the load, said detecting means providing an output corresponding to the voltage, said detecting means including means for translating said output and displaying a signal representative of the resistance of the load; and means for controlling display of the signal, wherein said control means includes comparator means responsive to the current passing through sensing resistor to operate said detecting means when said current pulse has said predetermined amplitude.

15. Apparatus for measuring the resistance of a load as recited in claim 14 wherein said detecting means is a digital voltmeter providing an end of conversion pulse after the resistance of the load has been measured, and said control means includes means responsive to said end of conversion pulse to render said controlled rectifier non-conductive to permit said capacitor to be recharged.

* * * * *